United States Patent
Yamaguchi

(10) Patent No.: US 10,466,439 B2
(45) Date of Patent: Nov. 5, 2019

(54) MIRROR HOLDING MECHANISM

(71) Applicant: NITTOH INC., Suwa-shi, Nagano (JP)

(72) Inventor: Takashi Yamaguchi, Suwa (JP)

(73) Assignee: Nittoh Inc. (JP)

( * ) Notice: Subject to any disclaimer, the term of this patent is extended or adjusted under 35 U.S.C. 154(b) by 0 days.

(21) Appl. No.: 15/757,860

(22) PCT Filed: Jun. 28, 2016

(86) PCT No.: PCT/JP2016/069063
§ 371 (c)(1),
(2) Date: Mar. 6, 2018

(87) PCT Pub. No.: WO2017/047194
PCT Pub. Date: Mar. 23, 2017

(65) Prior Publication Data
US 2018/0335606 A1 Nov. 22, 2018

(30) Foreign Application Priority Data
Sep. 18, 2015 (JP) .................................. 2015-184631

(51) Int. Cl.
*G02B 7/182* (2006.01)
*G02B 7/198* (2006.01)
*G03B 21/14* (2006.01)
*G03B 21/28* (2006.01)

(52) U.S. Cl.
CPC ............. *G02B 7/182* (2013.01); *G02B 7/198* (2013.01); *G03B 21/14* (2013.01); *G03B 21/28* (2013.01)

(58) Field of Classification Search
None
See application file for complete search history.

(56) References Cited

U.S. PATENT DOCUMENTS

| | | | | |
|---|---|---|---|---|
| 2009/0284819 | A1* | 11/2009 | Yamaguchi | G02B 7/182 359/221.2 |
| 2014/0247440 | A1* | 9/2014 | Yamada | G02B 26/101 356/5.01 |
| 2015/0010297 | A1* | 1/2015 | Sanada | G03B 19/12 396/358 |
| 2015/0378149 | A1* | 12/2015 | Imaizumi | G02B 26/0816 359/221.2 |

(Continued)

FOREIGN PATENT DOCUMENTS

JP 2014-137469 A 7/2014

*Primary Examiner* — Derek S. Chapel
(74) *Attorney, Agent, or Firm* — Harness, Dickey & Pierce, P.L.C.

(57) ABSTRACT

A mirror holding mechanism includes: a reflection mirror, a mirror holding member, and a cam member. The mirror holding member has two side surface portions sandwiching the reflection mirror in an X direction. In the side surface portion, a guide hole through which a shaft portion protruding from the reflection mirror to an outer side in the X direction is formed so as to pass through the side surface portion. The guide hole is formed into a long hole longitudinally extending in a Y direction. The cam member is disposed on an outer side of the side surface portion in the X direction and rotatably held by the side surface portion. On the cam member, a cam surface with which a distal end part of the shaft portion comes into contact is formed. When the cam member rotates, the shaft portion moves in the Y direction.

13 Claims, 7 Drawing Sheets

(56) References Cited

U.S. PATENT DOCUMENTS

2016/0054542 A1* 2/2016 Yamana .............. G02B 7/1821
                                                    359/874
2017/0168263 A1* 6/2017 Morita ................ G02B 7/1821
2017/0315429 A1* 11/2017 Imaizumi .............. G03B 19/12

* cited by examiner

MIRROR HOLDING MECHANISM

FIELD

The present invention relates to a mirror holding mechanism including a reflection mirror and a mirror holding member configured to hold the reflection mirror.

BACKGROUND

A curved mirror adjustment device including a curved mirror and a mirror holding member configured to hold the curved mirror has been known (see, for example, Patent Literature 1). The curved mirror adjustment device described in Patent Literature 1 includes: a first angle adjustment mechanism configured to adjust the angle of the curved mirror by rotating the curved mirror about a first axis, which is orthogonal to an optical axis, as a rotation axis; a second angle adjustment mechanism configured to adjust the angle of the curved mirror by rotating the curved mirror about a second axis, which is orthogonal to the optical axis and the first axis, as a rotation axis; a first position adjustment mechanism configured to adjust the position of the curved mirror by translating the curved mirror in a direction parallel to the first axis; and a second position adjustment mechanism configured to adjust the position of the curved mirror by translating the curved mirror in a direction parallel to the second axis. The curved mirror adjustment device further includes a fixation member to which the mirror holding member is fixed.

In the curved mirror adjustment device described in Patent Literature 1, the mirror holding member includes a first holding member and a second holding member. The second position adjustment mechanism is a washer disposed between the first holding member and the second holding member and/or a washer disposed between the second holding member and the fixation member. In the adjustment device, the washers are disposed between the first holding member and the second holding member and the washers are disposed between the second holding member and the fixation member on both sides in the first axial direction. Thus, by changing the thickness or number of the washers disposed on one side in the first axial direction and the thickness or number of the washers disposed on the other side in the first axial direction, the curved mirror can be rotated about the optical axis as a rotation axis to adjust the angle of the curved mirror.

CITATION LIST

Patent Literature

Patent Literature 1: JP 2014-137469 A

SUMMARY

Technical Problems

In the curved mirror adjustment device described in Patent Literature 1, the thickness or number of the washers disposed between the first holding member and the second holding member and the thickness or number of the washers disposed between the second holding member and the fixation member are changed to adjust the position of the curved mirror in the second axial direction and adjust the angle of the curved mirror about the optical axis as the rotation axis, and hence the position and angle of the curved mirror cannot be continuously adjusted. Specifically, it is difficult for the adjustment device to finely adjust the position or angle of the curved mirror. In the adjustment device, in order to adjust the position or angle of the curved mirror, it is necessary to remove and mount the washers by removing and mounting the first holding member from and to the second holding member and removing and mounting the second holding member from and to the fixation member. Thus, it is difficult for the adjustment device to adjust the position or angle of the curved mirror while checking a projection image reflected by the curved mirror and projected on a projection surface.

It is therefore an object of the present invention to provide a mirror holding mechanism capable of finely adjusting the position or angle of a reflection mirror while checking a projection image reflected by a reflection surface of the reflection mirror and projected on a projection surface.

Solution to Problem

In order to solve the above-mentioned problems, a mirror holding mechanism according to the present invention includes: a reflection mirror having a curved reflection surface; a mirror holding member configured to hold the reflection mirror; and a cam member rotatably held by the mirror holding member, in which when a direction parallel to an optical axis of the reflection mirror is a first direction, a direction orthogonal to the first direction is a second direction, and a direction orthogonal to the first direction and the second direction is a third direction, the mirror holding member has two side surface portions disposed so as to sandwich the reflection mirror in the second direction, at least one of the two side surface portions has a guide hole through which a shaft portion protruding from the reflection mirror to an outer side in the second direction is inserted, the guide hole being formed so as to pass through the side surface portion, the guide hole is formed into a long hole a longitudinal direction of which is an orthogonal direction orthogonal to the second direction, the cam member is disposed on an outer side of the side surface portion in the second direction and rotatably held by the side surface portion, the cam member has a cam surface with which a distal end part of the shaft portion comes into contact, and when the cam member rotates, the shaft portion moves in the orthogonal direction.

In the mirror holding mechanism according to the present invention, the guide hole through which the shaft portion protruding from the reflection mirror to the outer side in the second direction is inserted is formed in the side surface portion of the mirror holding member so as to pass through the side surface portion, and the cam member is disposed on the outer side of the side surface portion in the second direction and rotatably held by the side surface portion. In the present invention, the cam surface with which the distal end part of the shaft portion comes into contact is formed on the cam member, and when the cam member rotates, the shaft portion moves in the orthogonal direction orthogonal to the second direction. Thus, in the present invention, by rotating the cam member in the state in which the reflection mirror is mounted to the mirror holding member, the reflection mirror together with the shaft portion can be moved in the orthogonal direction orthogonal to the second direction to continuously adjust the position or angle of the reflection mirror with respect to the mirror holding member. Specifically, in the present invention, in the case of adjusting the position or angle of the reflection mirror, the position or angle of the reflection mirror can be continuously adjusted without removing and mounting the reflection mirror from and to the mirror holding member. Consequently, the present invention can finely adjust the position or angle of the reflection mirror while checking a projection image reflected by the reflection surface of the reflection mirror and projected on a projection surface.

In the present invention, for example, the orthogonal direction is the third direction. In this case, by rotating the cam member in the state in which the reflection mirror is mounted to the mirror holding member, the reflection mirror together with the shaft portion can be moved in the third direction to continuously adjust the position or angle of the reflection mirror with respect to the mirror holding member. In the present invention, the orthogonal direction may be the first direction. In this case, by rotating the cam member in the state in which the reflection mirror is mounted to the mirror holding member, the reflection mirror together with the shaft portion can be moved in the first direction to continuously adjust the position or angle of the reflection mirror with respect to the mirror holding member.

In the present invention, it is preferred that the cam member be held by the side surface portion so as to be rotatable about the second direction as an axial direction of the rotation. Such a configuration enables the mirror holding mechanism to be downsized in the second direction as compared with the case where the cam member is held by the side surface portion so as to be rotatable about the first direction or the third direction as an axial direction of the rotation.

In the present invention, for example, the shaft portions protrude from the reflection mirror to both outer sides in the second direction, the guide holes are formed in the two side surface portions, and the cam member is disposed on each of two outer sides of the two side surface portions in the second direction, respectively. In this case, for example, the position of the reflection mirror with respect to the mirror holding member can be adjusted in the third direction, and the angle of the reflection mirror about the first direction as an axial direction of the rotation with respect to the mirror holding member can be adjusted. In this case, for example, the position of the reflection mirror with respect to the mirror holding member can be adjusted in the first direction, and the angle of the reflection mirror about the third direction as an axial direction of the rotation with respect to the mirror holding member can be adjusted.

In the present invention, it is preferred that the mirror holding mechanism further include a shaft member that has the shaft portion formed therein and is formed separately from the reflection mirror, the orthogonal direction be the third direction, an engagement groove a longitudinal direction of which is the first direction and one end side in the first direction of which is opened be formed in each of both end surfaces of the reflection mirror in the second direction, one end side of the shaft member be engaged with the engagement groove, and another end side of the shaft member be the shaft portion. Such a configuration enables both end side portions of the reflection mirror in the second direction to be moved in the first direction with respect to the shaft member. Consequently, even when the guide hole is formed into a long hole a longitudinal direction of which is the third direction, the position of the reflection mirror with respect to the mirror holding member can be adjusted in the first direction, and the angle of the reflection mirror about the third direction as an axial direction of the rotation with respect to the mirror holding member can be adjusted.

In the present invention, it is preferred that the mirror holding mechanism further include a fixation bolt configured to fix the cam member to the side surface portion. Such a configuration can prevent the cam member from being deviated after the position or angle of the reflection mirror is adjusted.

In the present invention, it is preferred that a flat surface orthogonal to the first direction be formed on a surface opposite to the reflection surface of the reflection mirror on either side in the second direction. Such a configuration enables the use of a predetermined adjustment jig to push the flat surface in the first direction, thereby adjusting the position of the reflection mirror with respect to the mirror holding member in the first direction and adjusting the angle of the reflection mirror about the third direction as an axial direction of the rotation with respect to the mirror holding member.

In the present invention, it is preferred that the cam member has a gear formed on an outer circumferential surface thereof, and the side surface portion has a shaft support portion configured to rotatably support a rotation center shaft portion of an adjustment jig on which a jig-side gear to be engaged with the gear is formed on an outer circumferential surface thereof. Such a configuration enables the jig-side gear of the adjustment jig and the gear of the cam member to be easily and reliably engaged with each other. Consequently, the cam member can be easily rotated by using the adjustment jig, and as a result, the position or angle of the reflection mirror with respect to the mirror holding member can be easily adjusted.

Advantageous Effects of Invention

As described above, the mirror holding mechanism according to the present invention can finely adjust the position and angle of a reflection mirror while checking a projection image reflected by a reflection surface of the reflection mirror and projected on a projection surface.

DESCRIPTION OF EMBODIMENTS

Referring to the accompanying drawings, embodiments of the present invention are described below.

Schematic Configuration of Projection Optical System

Figure 1:
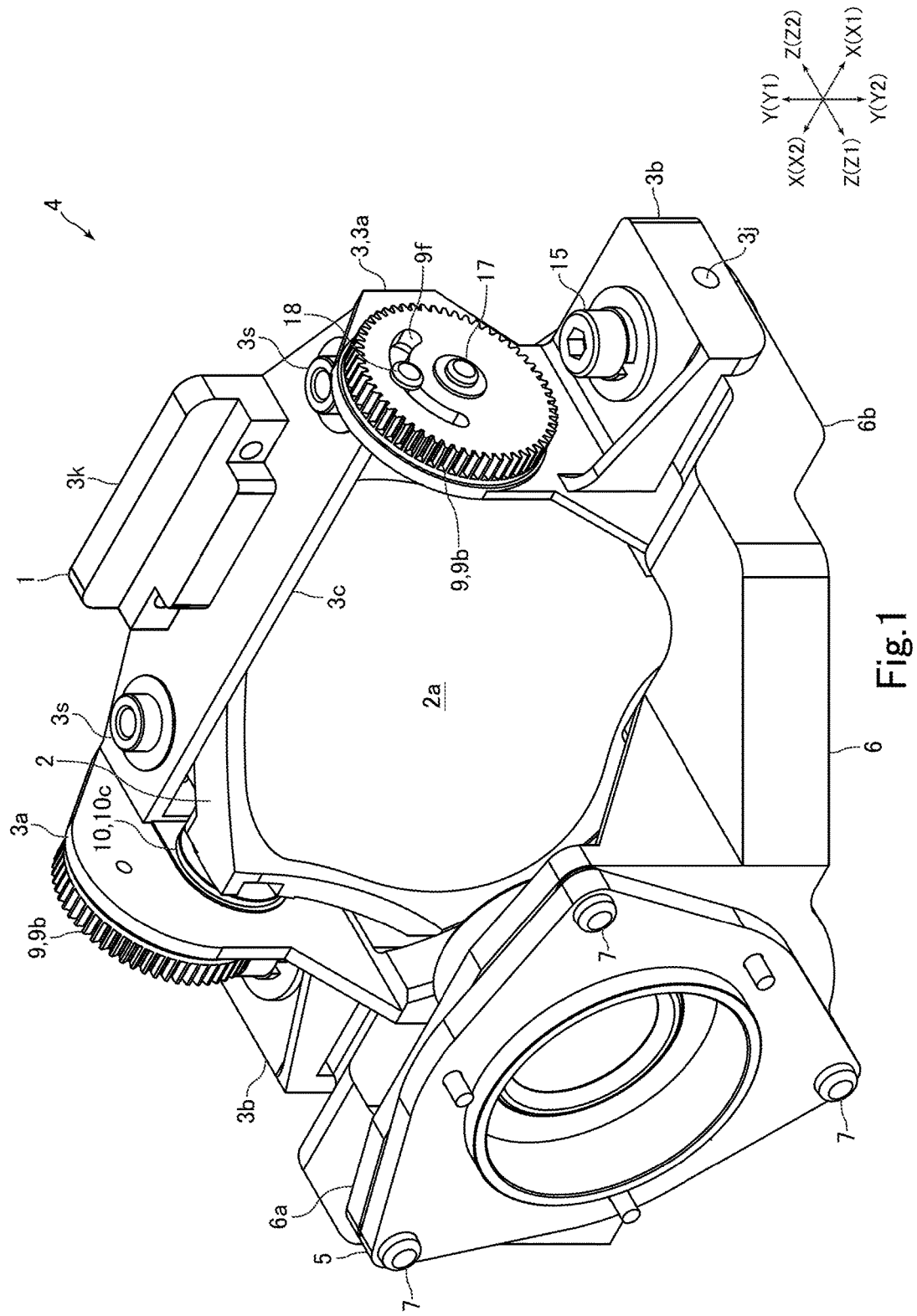
FIG. 1 is a perspective view of a projection optical system having a mirror holding mechanism according to an embodiment of the present invention.
Figure 2:
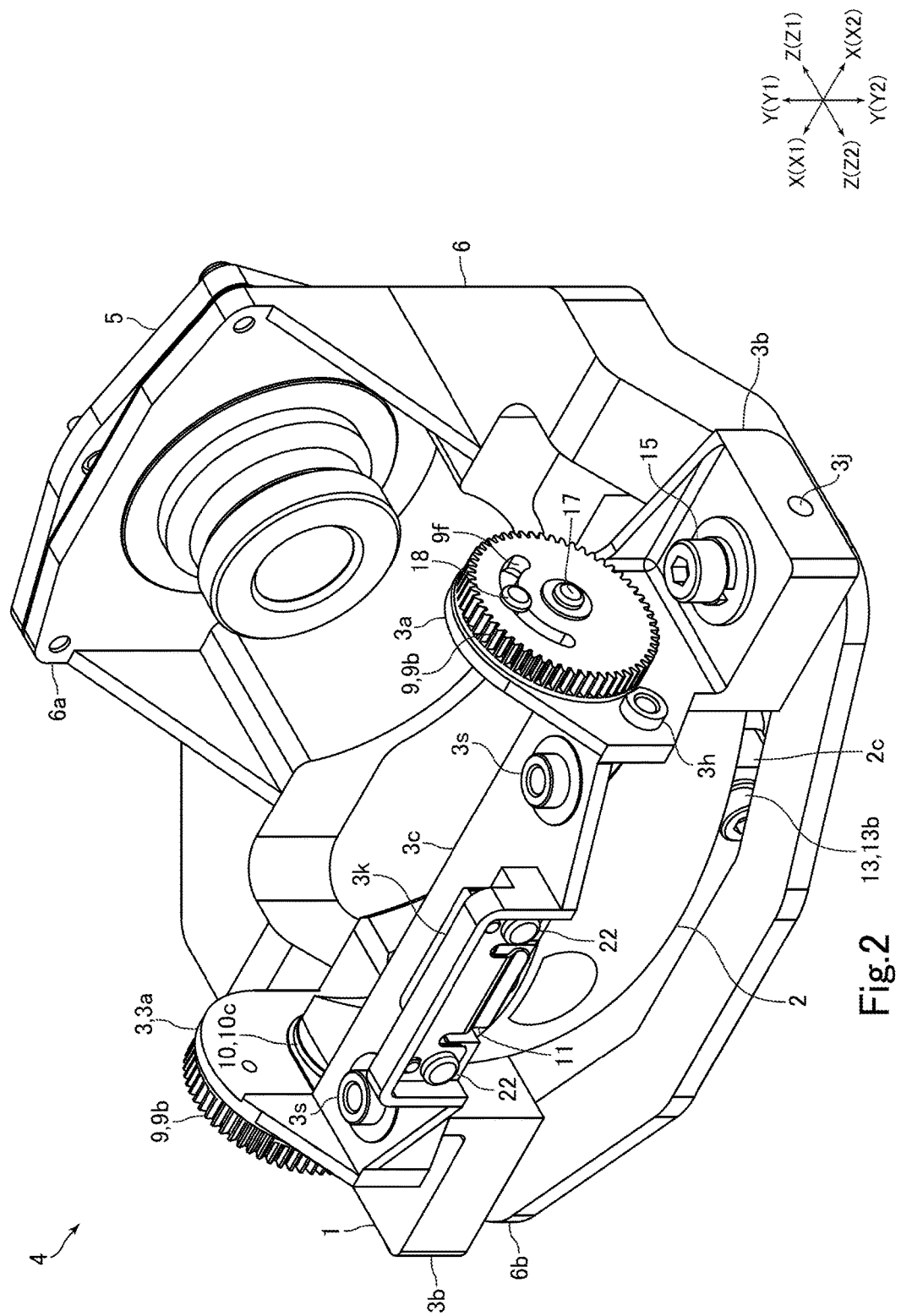
FIG. 2 is a perspective view of the projection optical system illustrated in FIG. 1 from a different angle.

FIG. 1 is a perspective view of a projection optical system 4 having a mirror holding mechanism 1 according to an embodiment of the present invention. FIG. 2 is a perspective view of the projection optical system 4 illustrated in FIG. 1 from a different angle.

The mirror holding mechanism 1 in the present embodiment includes a reflection mirror 2 having a curved reflection surface 2a, and a mirror holding frame 3 serving as a mirror holding member configured to hold the reflection mirror 2. The mirror holding mechanism 1 constitutes a part of the projection optical system 4. The projection optical system 4 enlarges image light from an image adjustment element (not shown) and projects the enlarged image light onto a projection surface such as a screen. The projection optical system 4 includes an imaging optical system, and the imaging optical system is formed of lenses. In the projection optical system 4, image light emitted from an image adjustment element and transmitted through the imaging optical system is reflected by the reflection surface 2a and projected on the projection surface in an enlarged manner. The projection optical system 4 can increase a projection view angle by using the reflection surface 2a. Thus, the projection optical system 4 can project a large projection image onto a projection surface even at a short projection distance.

In the following description, a direction (Z direction in FIG. 1 and other figures) parallel to an optical axis of the reflection mirror 2 is referred to as "front-back direction", an X direction in FIG. 1 and other figures orthogonal to the front-back direction is referred to as "horizontal direction", and a Y direction in FIG. 1 and other figures orthogonal to the front-back direction and the horizontal direction is referred to as "vertical direction". A Z1 direction, which is on one side in the Z direction, is referred to as "front direction". A Z2 direction, which is on the other side in the Z direction, is referred to as "rear (back) direction". An X1 direction, which is on one side in the X direction, is referred to as "right direction". An X2 direction, which is on the other side in the X direction, is referred to as "left direction". A Y1 direction, which is on one side in the Y direction, is referred to as "up direction". A Y2 direction, which is on the other side in the Y direction, is referred to as "down direction". In the present embodiment, the front-back direction (Z direction) is a first direction, the horizontal direction (X direction) is a second direction, and the vertical direction (Y direction) is a third direction. The vertical direction in the present embodiment is an orthogonal direction orthogonal to the horizontal direction as the second direction.

The projection optical system 4 includes a lens barrel 5 in which the lenses of the imaging optical system are disposed on an inner peripheral side thereof, and a fixation frame 6 to which the mirror holding frame 3 is fixed and which is fixed to the lens barrel 5. Each of the lenses is held by a lens frame. The lens frame is disposed on the inner peripheral side of the lens barrel 5 so as to be movable in the front-back direction. In FIG. 1 and FIG. 2, only a part of the lens barrel 5 on the rear end side is illustrated.

The lens barrel 5 is disposed such that an optical axis of the imaging optical system is parallel to the front-back direction. The lens barrel 5 is disposed such that the optical axis of the imaging optical system and the optical axis of the reflection mirror 2 are substantially aligned with each other. The image adjustment element is disposed on the front side of the lens barrel 5. Image light emitted from the image adjustment element passes through the imaging optical system to the rear side. The fixation frame 6 is a frame-shaped member configured to hold the mirror holding frame 3. The fixation frame 6 includes a portion to be fixed 6a that is fixed to the lens barrel 5, and a fixation portion 6b to which the mirror holding frame 3 is fixed. The portion to be fixed 6a constitutes a front part of the fixation frame 6, and the fixation portion 6b constitutes a rear part of the fixation frame 6. The portion to be fixed 6a is fixed to a rear end side of the lens barrel 5 with a bolt 7.

Configuration of Mirror Holding Mechanism

Figure 3:
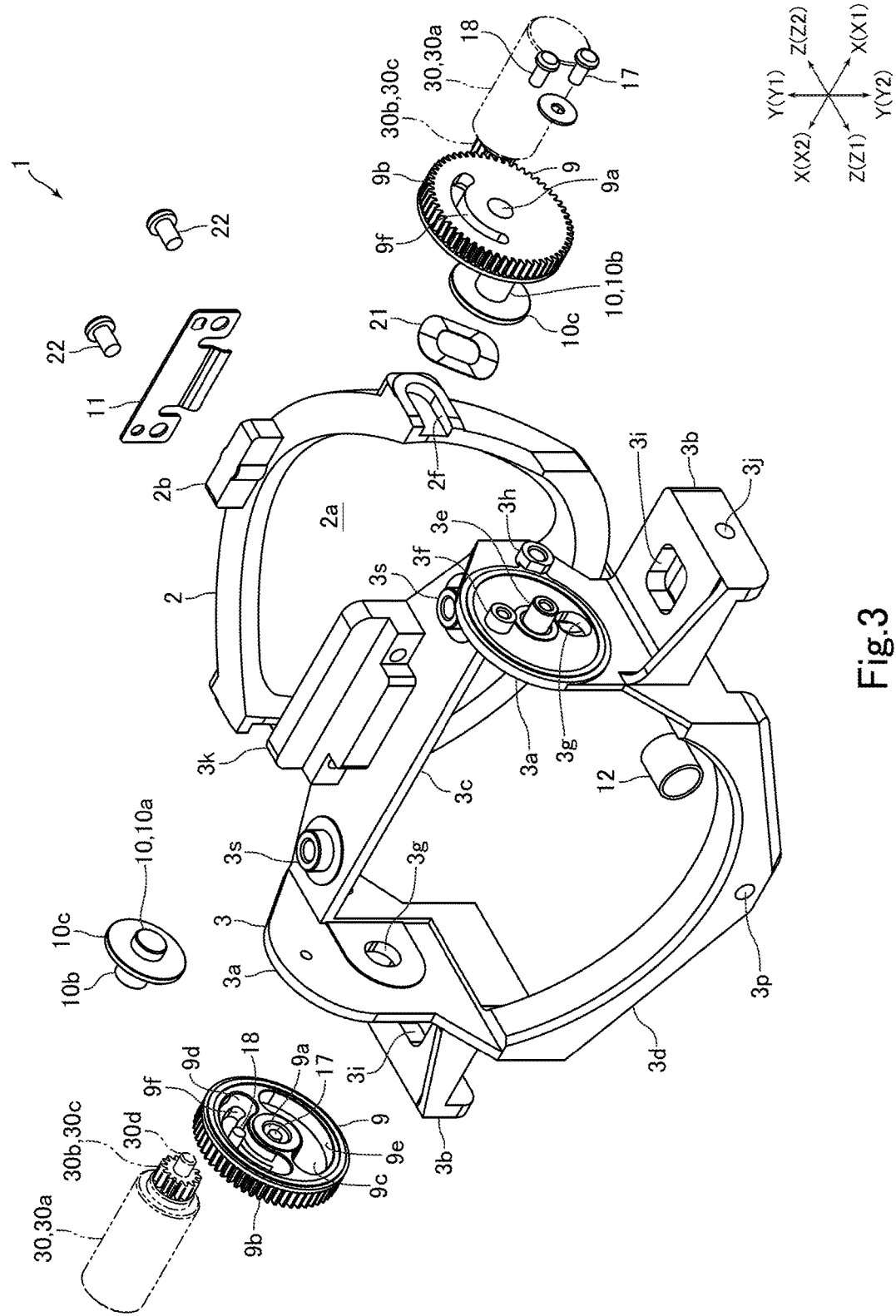
FIG. 3 is an exploded perspective view of the mirror holding mechanism illustrated in FIG. 1.
Figure 4:
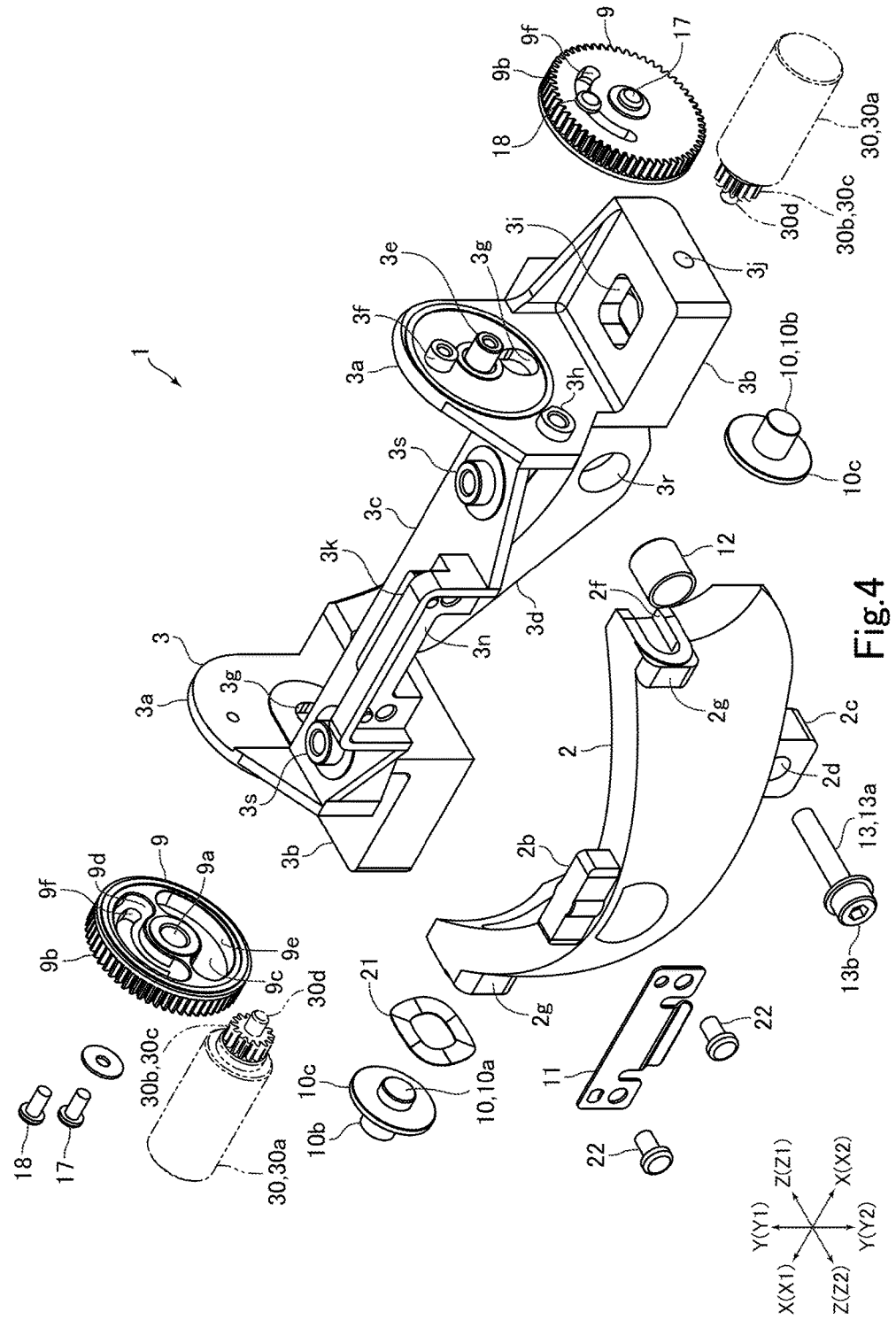
FIG. 4 is an exploded perspective view of the mirror holding mechanism illustrated in FIG. 1 from an angle different from that in FIG. 3.
Figure 5:
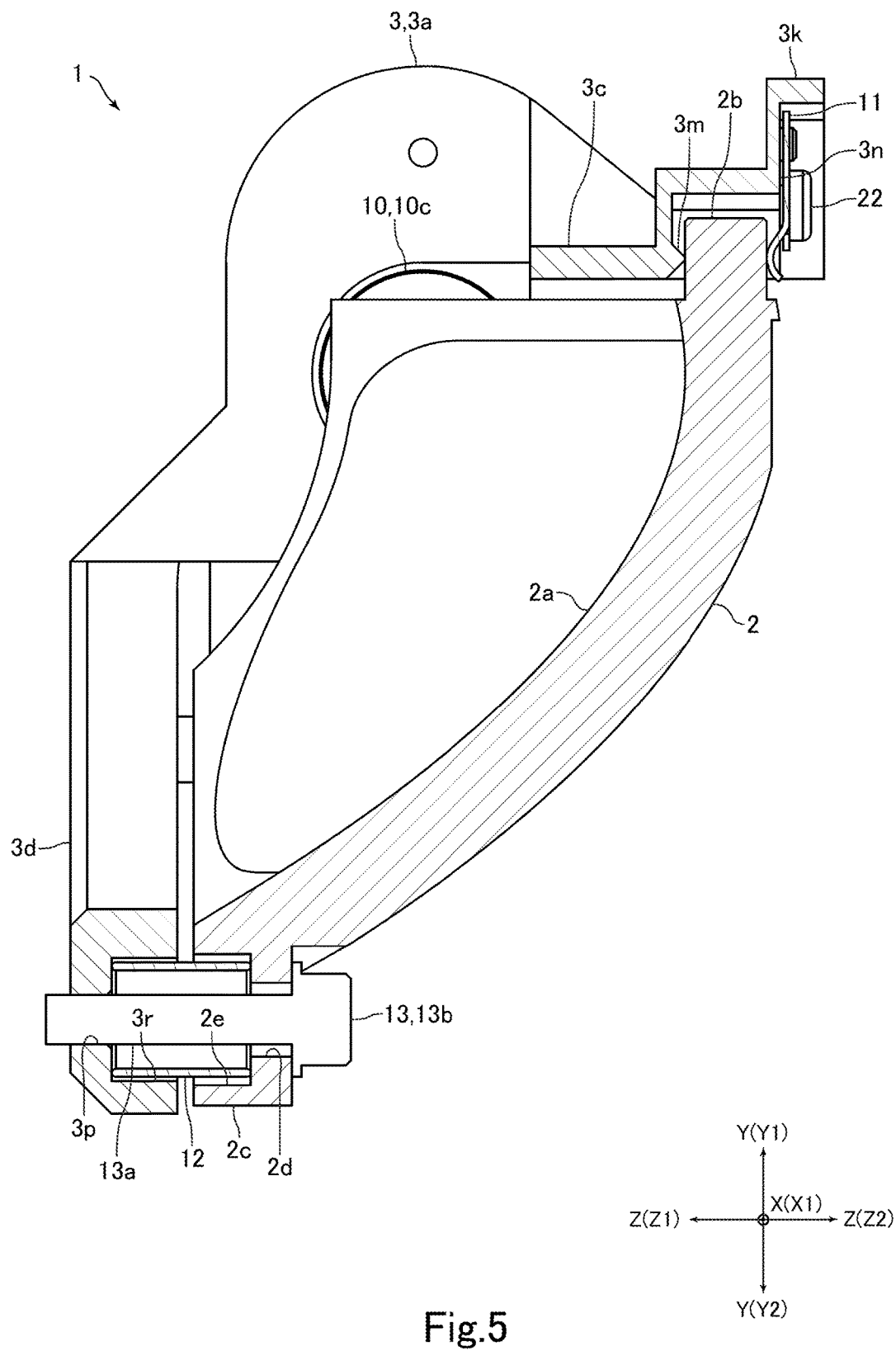
FIG. 5 is a vertical cross-sectional view of the mirror holding mechanism illustrated in FIG. 1.
Figure 6:
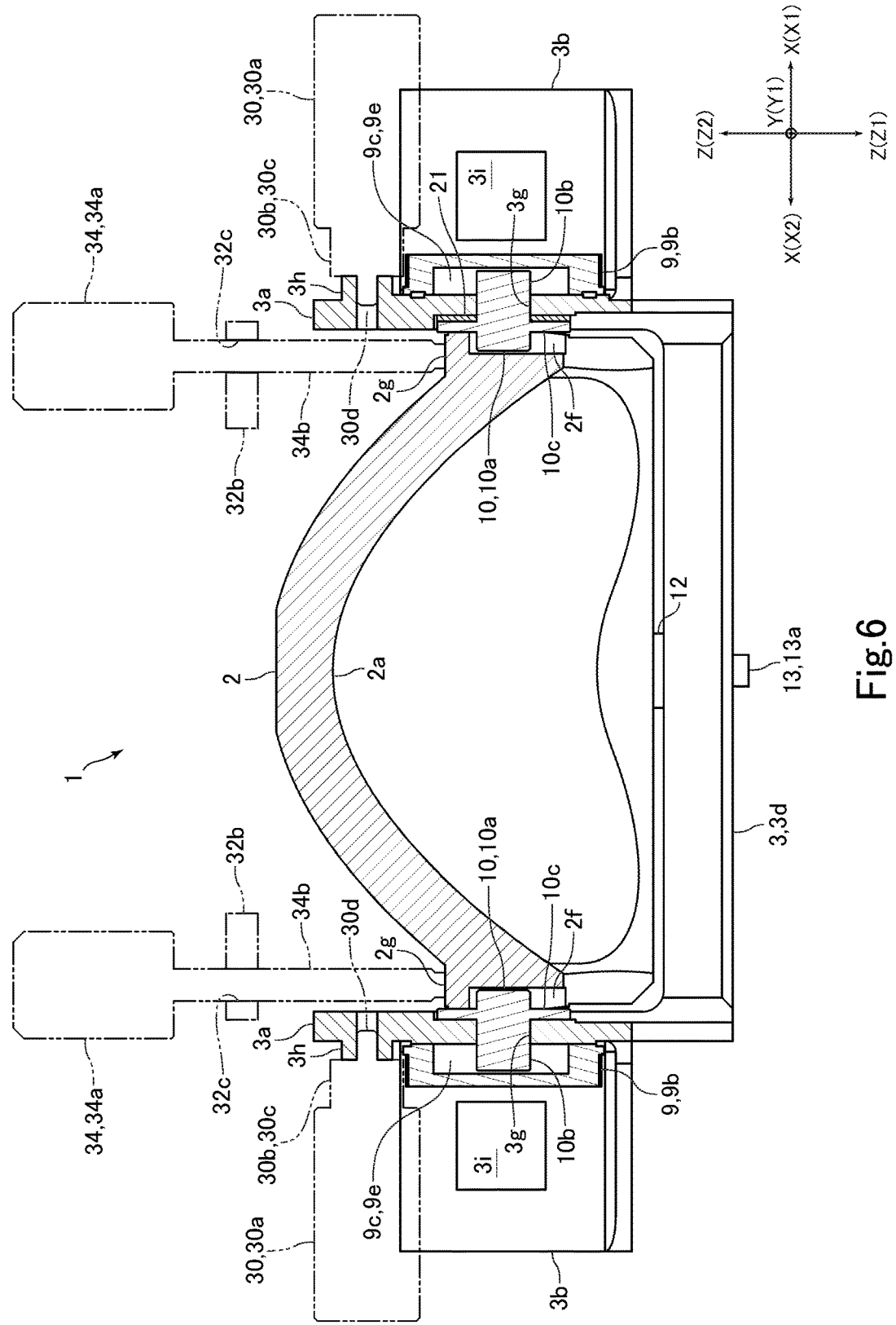
FIG. 6 is a horizontal cross-sectional view of the mirror holding mechanism illustrated in FIG. 1.

FIG. 3 is an exploded perspective view of the mirror holding mechanism 1 illustrated in FIG. 1. FIG. 4 is an exploded perspective view of the mirror holding mechanism 1 illustrated in FIG. 1 from an angle different from that in FIG. 3. FIG. 5 is a vertical cross-sectional view of the mirror holding mechanism 1 illustrated in FIG. 1. FIG. 6 is a horizontal cross-sectional view of the mirror holding mechanism 1 illustrated in FIG. 1.

The mirror holding mechanism 1 includes, in addition to the reflection mirror 2 and the mirror holding frame 3 described above, two cam members 9 that are rotatably held by the mirror holding frame 3 and two shaft members 10 that are each engaged with the reflection mirror 2 on one end side and engaged with the mirror holding frame 3 and the cam member 9 on the other end side. The mirror holding mechanism 1 includes a leaf spring 11 configured to energize an upper portion of the reflection mirror 2 to the front, a compression coil spring 12 configured to energize a lower portion of the reflection mirror 2 to the rear, and a bolt 13 connecting the lower portion of the reflection mirror 2 and a lower portion of the mirror holding frame 3 to each other.

The shaft members 10 are formed separately from the reflection mirror 2. Each of the shaft member 10 is formed into a column with a flange. The shaft member 10 includes a columnar shaft portion 10a constituting one end-side part of the shaft member 10, a columnar shaft portion 10b constituting the other end-side part of the shaft member 10, and a disc-shaped flange portion 10c disposed between the shaft portion 10a and the shaft portion 10b. The length of the shaft portion 10a is shorter than the length of the shaft portion 10b. For example, the bolt 13 is a hexagon socket head bolt, and includes a shaft portion 13a and a head portion 13b. A male thread is formed on the distal end side of the shaft portion 13a.

The reflection mirror 2 is formed into a substantially curved plate in which the front surface is a concave curved surface and the rear surface is a convex curved surface. The reflection surface 2a is formed on the front surface of the reflection mirror 2. Specifically, the concave curved reflection surface 2a is formed on the reflection mirror 2. At the center of an upper end of the reflection mirror 2, a spring abutment portion 2b with which the leaf spring 11 comes into contact is formed so as to protrude upward. At the center of a lower end of the reflection mirror 2, a bolt engagement portion 2c with which the bolt 13 is engaged is formed so as to protrude downward.

To the bolt engagement portion 2c, a through hole 2d that passes therethrough in the front-back direction is formed. Specifically, the through hole 2d is formed on a lower part of the reflection mirror 2. The through hole 2d is formed into a circular hole. The inner diameter of the through hole 2d is larger than the outer diameter of the shaft portion 13a of the bolt 13. As illustrated in FIG. 5, a concave portion 2e in which a part of the compression coil spring 12 is disposed is formed in the front surface of the bolt engagement portion 2c. The concave portion 2e is formed so as to be recessed to the rear side from the front surface of the bolt engagement portion 2c. The concave portion 2e is formed such that the shape of an inner circumferential surface when viewed from the front-back direction is circular. The concave portion 2e is disposed coaxially with the through hole 2d.

Engagement grooves 2f to be engaged with the shaft portions 10a of the shaft member 10 are formed in both end surfaces of the reflection mirror 2 in the horizontal direction.

The engagement grooves 2f are formed such that the longitudinal direction of the engagement grooves 2f matches with the front-back direction. The engagement grooves 2f are formed so as to be recessed toward the inner side in the horizontal direction. The front end side of the engagement grooves 2f is opened, and the shape of the engagement groove 2f when viewed from the horizontal direction is substantially a U-shape. The width of the engagement grooves 2f in the vertical direction is substantially equal to the outer diameter of the shaft portions 10a. A flat surface 2g orthogonal to the front-back direction is formed on either end side of the rear surface of the reflection mirror 2 in the horizontal direction. In the present embodiment, the flat surface 2g is formed behind the engagement groove 2f, and the engagement groove 2f and the flat surface 2g are formed so as to overlap with each other in the front-back direction.

The mirror holding frame 3 is a frame-shaped member configured to hold the reflection mirror 2. The mirror holding frame 3 includes two side surface portions 3a disposed on each of the right and left sides of the reflection mirror 2 so as to sandwich the reflection mirror 2 in the horizontal direction, two portions to be fixed 3b that are placed and fixed to the fixation portion 6b of the fixation frame 6, and a coupling portion 3c and a coupling portion 3d configured to couple the two side surface portions 3a. The side surface portions 3a are formed into substantially flat plates, and are disposed such that the thickness direction of the side surface portions 3a matches with the horizontal direction. The two portions to be fixed 3b are connected to lower sides of the two side surface portions 3a, respectively. The two portions to be fixed 3b expand outward in the horizontal direction from the two side surface portions 3a, respectively. The coupling portion 3c is formed into a substantially flat plate, and is disposed such that the thickness direction of the coupling portion 3c matches with the vertical direction. The coupling portion 3c connects the two side surface portions 3a at the lower end side and the rear end side. The coupling portion 3d is formed such that the shape when viewed from the front-back direction is a substantially arc that expands downward, and connects the two side surface portions 3a at the lower end side and the front end side. The coupling portion 3d protrudes to the lower side of the side surface portions 3a.

The two side surface portions 3a sandwich an upper part of the reflection mirror 2 in the horizontal direction. A columnar support shaft 3e configured to rotatably support the cam member 9, a columnar protruding portion 3f configured to fix the cam member 9, a guide hole 3g through which the shaft portion 10b of the shaft member 10 is inserted, and a cylindrical shaft support portion 3h configured to support an adjustment jig 30 described later are formed on the side surface portion 3a. The support shaft 3e, the protruding portion 3f, and the shaft support portion 3h are formed so as to protrude from an outer surface of each of the two side surface portions 3a in the horizontal direction to the outer side in the horizontal direction. Screw holes are formed on the distal end side of the support shaft 3e and the distal end side of the protruding portion 3f. The protruding portion 3f is disposed directly above the support shaft 3e. The guide hole 3g is formed so as to pass through the side surface portion 3a. The guide hole 3g is formed into a long hole the longitudinal direction of which is the vertical direction. The width of the guide hole 3g in the front-back direction is substantially equal to the outer diameter of the shaft portion 10b. The guide hole 3g is disposed directly under the support shaft 3e. Specifically, the protruding portion 3f, the support shaft 3e, and the guide hole 3g are formed side by side in this order from the upper side in the vertical direction. The shaft support portion 3h is disposed behind the guide hole 3g.

In the portion to be fixed 3b, a through hole 3i passing therethrough in the vertical direction is formed. The portion to be fixed 3b is fixed to the fixation portion 6b with a bolt 15 inserted through the through hole 3i in the state in which the portion to be fixed 3b is placed on the fixation portion 6b of the fixation frame 6. In the portion to be fixed 3b, a screw hole 3j for adjusting the position of the mirror holding frame 3 in the horizontal direction with respect to the fixation frame 6 is formed. Specifically, the screw holes 3j are formed from both laterally outer surfaces of the two portions to be fixed 3b toward the inner side in the horizontal direction.

At the center of the upper surface of the coupling portion 3c, a spring fixation portion 3k to which the leaf spring 11 is fixed is formed so as to protrude upward. In the spring fixation portion 3k, an abutment portion 3m with which the spring abutment portion 2b of the reflection mirror 2 comes into contact from the rear side is formed (see FIG. 5). On the rear surface side of the spring fixation portion 3k, a flat spring fixation surface 3n to which the leaf spring 11 is fixed is formed. The spring fixation surface 3n is disposed behind the abutment portion 3m. On both end sides of the coupling portion 3c in the horizontal direction, columnar protruding portions 3s configured to position and fix adjustment jigs 31 described later are formed so as to protrude upward. Screw holes are formed on the distal end side of the protruding portions 3s.

On the lower end side of the coupling portion 3d, a screw hole 3p with which a male thread of the bolt 13 is engaged and a concave portion 3r in which a part of the compression coil spring 12 is disposed are formed. The concave portion 3r is formed so as to be recessed from the rear surface of the coupling portion 3d to the front side. The concave portion 3r is formed such that the shape of an inner circumferential surface when viewed from the front-back direction is circular. The screw hole 3p is formed on the front side of the concave portion 3r. The screw hole 3p is disposed coaxially with the concave portion 3r.

The cam member 9 is formed into a substantially disc shape. At the center of the cam member 9, an insertion hole 9a through which the support shaft 3e of the mirror holding frame 3 is inserted is formed. The insertion hole 9a is formed so as to pass through the cam member 9. A gear 9b is formed on the outer circumferential surface of the cam member 9. The gear 9b is formed over the entire outer circumferential surface of the cam member 9. On one surface of the cam member 9, a cam groove 9c to which a distal end part of the shaft portion 10b of the shaft member 10 is engaged and a relief groove 9d for preventing interference between the rotating cam member 9 and the protruding portion 3f of the mirror holding frame 3 are formed. The cam groove 9c and the relief groove 9d are disposed so as to be recessed from one surface of the cam member 9 toward the other surface.

The cam groove 9c is formed into a substantially semi-circular-arc shape. The outer surface of the cam groove 9c in the radial direction of the cam member 9 is a cam surface 9e with which the distal end part of the shaft portion 10b comes into contact. The cam surface 9e is formed into a curved surface in which the distance between the center of the cam member 9 and the cam surface 9e continuously changes in the circumferential direction of the cam member 9. The relief groove 9d is formed into a substantially semi-circular-arc shape. The relief groove 9d is formed in a region in which the cam groove 9c is not formed. In the range in which the relief groove 9d is formed, an arc-shaped through hole 9f passing through the cam member 9 is formed.

The cam member 9 is disposed on the outer side of the side surface portion 3a in the horizontal direction. Specifically, the two cam members 9 are disposed on both outer sides of the two side surface portions 3a, respectively, in the horizontal direction. The cam member 9 is disposed such that the surface in which the cam groove 9c and the relief groove 9d are formed faces inward in the horizontal direction. The cam member 9 is rotatably held by the side surface portion 3a. Specifically, the cam member 9 is mounted to the side surface portion 3a with a bolt 17 that is engaged with a screw hole in the support shaft 3e from the outer side of the cam member 9 in the horizontal direction in the state in which the support shaft 3e of the side surface portion 3a is inserted to the insertion hole 9a. The cam member 9 is rotatably supported by the support shaft 3e, and rotates about the horizontal direction as an axial direction of the rotation. In the state in which the cam member 9 is held by the side surface portion 3a, the protruding portion 3f of the side surface portion 3a is disposed inside the relief groove 9d. A bolt 18 is inserted to the through hole 9f from the outer side of the cam member 9 in the horizontal direction. The distal end side of the bolt 18 is engaged with a screw hole in the protruding portion 3f. The bolt 18 serves to fix the cam member 9 to the side surface portion 3a. The bolt 18 in the present embodiment is a fixation bolt for fixing the cam member 9 to the side surface portion 3a.

As described above, the reflection mirror 2 is disposed between the two side surface portions 3a. In this state, as illustrated in FIG. 6, the shaft portion 10a of the shaft member 10 is engaged with the engagement groove 2f in the reflection mirror 2. The shaft portion 10b is inserted to the guide hole 3g. A distal end part of the shaft portion 10b is engaged with the cam groove 9c and in contact with the cam surface 9e. Thus, when the cam member 9 rotates, the shaft member 10 continuously moves in the vertical direction along the guide hole 3g, and the right end side and/or the left end side of the reflection mirror 2 continuously moves in the vertical direction together with the shaft member 10. The shaft portion 10b is inserted to the guide hole 3g, and a distal end part of the shaft portion 10b is engaged with the cam groove 9c. The shaft portion 10b protrudes from the reflection mirror 2 to the outer side in the horizontal direction. Specifically, the two shaft portions 10b protrude from the reflection mirror 2 to both outer sides in the horizontal direction, respectively. A wave washer 21 is disposed between the flange portion 10c of the shaft member 10 disposed on the right side and the side surface portion 3a disposed on the right side. The shaft portion 10b is inserted in the inner circumferential side of the wave washer 21. The wave washer 21 energizes the reflection mirror 2 and the two shaft members 10 toward the side surface portion 3a disposed on the left side.

In the state in which the reflection mirror 2 is disposed between the two side surface portions 3a, the spring abutment portion 2b of the reflection mirror 2 is disposed behind the abutment portion 3m of the spring fixation portion 3k of the mirror holding frame 3. In this state, the bolt engagement portion 2c of the reflection mirror 2 is disposed behind a lower end part of the coupling portion 3d of the mirror holding frame 3. The leaf spring 11 is fixed to the spring fixation surface 3n of the spring fixation portion 3k with bolts 22. The leaf spring 11 energizes the spring abutment portion 2b such that the spring abutment portion 2b abuts on the abutment portion 3m from the rear side.

As illustrated in FIG. 5, the front end side of the compression coil spring 12 is disposed inside the concave portion 3r of the mirror holding frame 3, and the rear end side of the compression coil spring 12 is disposed inside the concave portion 2e of the reflection mirror 2. The head portion 13b of the bolt 13 is disposed behind the bolt engagement portion 2c. The shaft portion 13a is inserted in the through hole 2d and the inner circumferential side of the compression coil spring 12. The male thread formed on the shaft portion 13a is engaged with the screw hole 3p in the coupling portion 3d. The compression coil spring 12 energizes the bolt engagement portion 2c such that the bolt engagement portion 2c and a lower part of the coupling portion 3d are separated away from each other and the bolt engagement portion 2c contacts with the head portion 13b. Thus, the lower part of the reflection mirror 2 is held by the lower part of the mirror holding frame 3 so as not to move with respect to the lower part of the mirror holding frame 3.

Method for Adjusting Reflection Mirror

Figure 7:
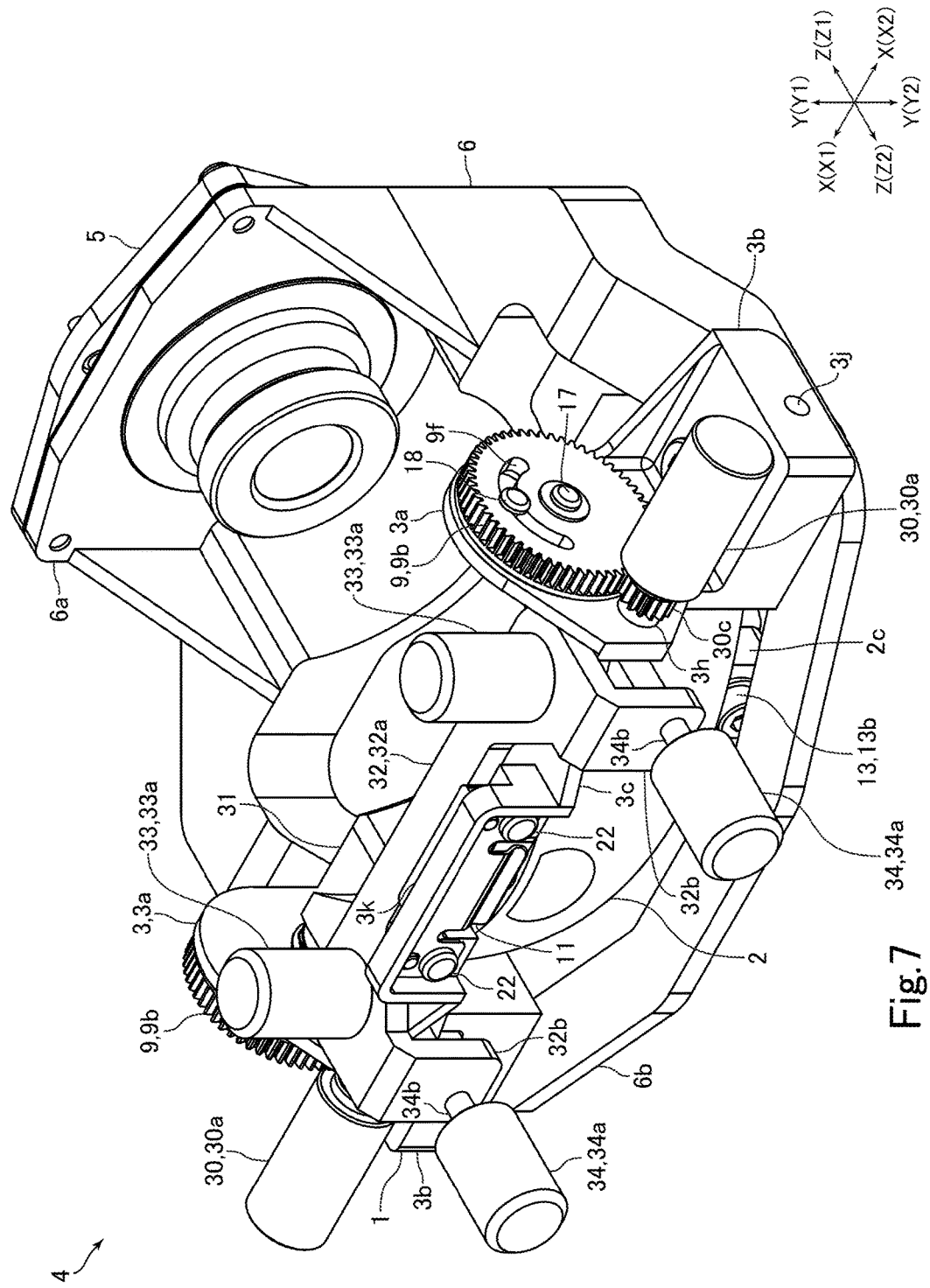
FIG. 7 is a perspective view for describing a state in which the reflection mirror is adjusted in the projection optical system illustrated in FIG. 1.

FIG. 7 is a perspective view for describing a state in which the reflection mirror 2 is adjusted in the projection optical system 4 illustrated in FIG. 1.

In the projection optical system 4, the angle and position of the reflection mirror 2 are adjusted as follows. Specifically, the mounting position of the fixation frame 6 in the front-back direction with respect to the lens barrel 5 is adjusted to adjust the position of the reflection mirror 2 in the front-back direction. Specifically, in the state in which the bolts 7 are removed or the bolts 7 are loosened, the thickness or number of washers (not shown) disposed between the portion to be fixed 6a of the fixation frame 6 and the lens barrel 5 is changed to adjust the mounting position of the fixation frame 6 in the front-back direction with respect to the lens barrel 5, thereby adjusting the position of the reflection mirror 2 in the front-back direction. After the adjustment of the position of the reflection mirror 2 in the front-back direction is finished, the bolts 7 are fastened to fix the portion to be fixed 6a to the lens barrel 5.

The mounting position of the mirror holding frame 3 in the horizontal direction with respect to the fixation frame 6 is adjusted to adjust the position of the reflection mirror 2 in the horizontal direction. Specifically, in the state in which the bolt 15 is loosened, an adjustment bolt (not shown) is engaged with the screw hole 3j in the mirror holding frame 3 from the outer side in the horizontal direction such that the distal end of the adjustment bolt contacts with the fixation frame 6, and the screwed amount of the adjustment bolt in the screw hole 3j is adjusted to adjust the mounting position of the mirror holding frame 3 in the horizontal direction with respect to the fixation frame 6, thereby adjusting the position of the reflection mirror 2 in the horizontal direction. After the adjustment of the position of the reflection mirror 2 in the horizontal direction is finished, the bolt 15 is fastened to fix the mirror holding frame 3 to the fixation frame 6. The adjustment bolt may be removed from the screw hole 3j after the position of the reflection mirror 2 in the horizontal direction is adjusted.

In addition, in the state in which the bolts 18 are removed or the bolts 18 are loosened, the two cam members 9 are rotated in the same direction by the same angle to raise or lower both lateral sides of the reflection mirror 2 by the same amount with respect to the mirror holding frame 3, thereby adjusting the position of the reflection mirror 2 in the vertical direction. In the state in which the bolts 18 are removed or the bolts 18 are loosened, one cam member 9 is rotated, the two cam members 9 are rotated in different directions, or the two cam members 9 are rotated in the same direction by different angles to raise or lower both lateral sides of the reflection mirror 2 by different amounts with respect to the mirror holding frame 3, thereby adjusting the angle of the reflection mirror 2 about the front-back direction as an axial direction of the rotation. After the adjustment of the position of the reflection mirror 2 in the vertical direction and the adjustment of the angle of the reflection mirror 2 about the front-back direction as an axial direction of the rotation is finished, the bolts 18 are fastened to the screw holes in the protruding portion 3f to fix the cam members 9 to the side surface portions 3a.

The adjustment of the position of the reflection mirror 2 in the vertical direction and the adjustment of the angle of the reflection mirror 2 about the front-back direction as an axial direction of the rotation are performed in the state in which the mirror holding frame 3 is fixed to the fixation frame 6, the fixation frame 6 is fixed to the lens barrel 5, and the reflection mirror 2 is mounted to the mirror holding frame 3 with the leaf spring 11, the compression coil spring 12, and the bolts 13 and 22. As described above, the inner diameter of the through hole 2d in the reflection mirror 2 is larger than the outer diameter of the shaft portion 13a of the bolt 13, and hence the position of the reflection mirror 2 in the vertical direction and the angle of the reflection mirror 2 about the front-back direction as an axial direction of the rotation can be adjusted even in the state in which the bolt 13 is mounted. Because the wave washer 21 is deformed, the angle of the reflection mirror 2 about the front-back direction as an axial direction of the rotation can be adjusted.

In the present embodiment, the adjustment jigs 30 are used to adjust the position of the reflection mirror 2 in the vertical direction and the angle of the reflection mirror 2 about the front-back direction as an axial direction of the rotation. The adjustment jig 30 includes a grip portion 30a formed into a circular column, a gear portion 30c on which a jig-side gear 30b to be engaged with the gear 9b of the cam member 9 is formed on its outer circumferential surface, and a columnar rotation center shaft portion 30d rotatably supported by the shaft support portion 3h of the side surface portion 3a. The grip portion 30a, the gear portion 30c, and the rotation center shaft portion 30d are disposed in this order in the axial direction of the adjustment jig 30. For adjusting the position of the reflection mirror 2 in the vertical direction and the angle of the reflection mirror 2 about the front-back direction as an axial direction of the rotation, the rotation center shaft portion 30d is inserted in the shaft support portion 3h such that the gear 9b and the jig-side gear 30b are engaged with each other, and then the adjustment jig 30 is rotated while gripping the grip portion 30a. When the adjustment jig 30 rotates, the cam member 9 also rotates together with the adjustment jig 30, and the position of the reflection mirror 2 in the vertical direction or the angle of the reflection mirror 2 about the front-back direction as an axial direction of the rotation is adjusted. After the adjustment is finished, the adjustment jig 30 is removed.

In addition, the flat surfaces 2g of the reflection mirror 2 are pushed to adjust the angle of the reflection mirror 2 about the vertical direction as an axial direction of the rotation. In the present embodiment, the adjustment jig 31 is used to adjust the angle of the reflection mirror 2 about the vertical direction as an axial direction of the rotation. The adjustment jig 31 includes a jig main body portion 32, two fixation bolts 33 configured to fix the jig main body portion 32 to the mirror holding frame 3, and two adjustment bolts 34 configured to adjust the angle of the reflection mirror 2. The fixation bolt 33 includes a grip portion 33a and a shaft portion (not shown) protruding from the grip portion 33a. The shaft portion has a male thread formed thereon. The adjustment bolt 34 includes a grip portion 34a and a shaft portion 34b protruding from the grip portion 34a. The shaft portion 34b has a male thread formed thereon. The distal end of the shaft portion 34b has a flat surface (see FIG. 6).

The jig main body portion 32 includes a plate-shaped portion to be fixed 32a that is placed and fixed on the coupling portion 3c of the mirror holding frame 3, and two bolt holding portions 32b configured to hold the adjustment bolts 34. Through holes (not shown) through which the shaft portions of the fixation bolts 33 are inserted are formed on both lateral end sides of the portion to be fixed 32a. The bolt holding portions 32b are formed into flat plates orthogonal to the front-back direction. The two bolt holding portions 32b are connected to both lateral end sides of the portion to be fixed 32a, respectively. The two bolt holding portions 32b are formed so as to be bent at a right angle from both lateral end sides of the portion to be fixed 32a, respectively. Screw holes 32c with which the male threads of the shaft portions 34b of the adjustment bolts 34 are engaged are formed in the bolt holding portions 32b (see FIG. 6).

The adjustment jig 31 is mounted to the mirror holding frame 3 in a manner that the portion to be fixed 32a is placed on the coupling portion 3c and the male threads of the fixation bolts 33 are threaded into the screw holes in the protruding portions 3s. The distal ends of the shaft portions 34b of the two adjustment bolts 34 mounted to the jig main body portion 32 are disposed at positions that allow contact to the two flat surfaces 2g of the reflection mirror 2 from the rear side, respectively. The screwed amounts of the adjustment bolts 34 in the screw holes 32c are adjusted to adjust the pushed amounts of the two flat surfaces 2g, thereby adjusting the angle of the reflection mirror 2 about the vertical direction as an axial direction of the rotation. After the adjustment of the angle of the reflection mirror 2 about the vertical direction as an axial direction of the rotation is finished, the adjustment jig 31 is removed from the mirror holding frame 3.

The adjustment of the angle of the reflection mirror 2 about the vertical direction as an axial direction of the rotation is also performed in the state in which the mirror holding frame 3 is fixed to the fixation frame 6, the fixation frame 6 is fixed to the lens barrel 5, and the reflection mirror 2 is mounted to the mirror holding frame 3 with the leaf spring 11, the compression coil spring 12, and the bolts 13 and 22. As described above, the inner diameter of the through hole 2d in the reflection mirror 2 is larger than the outer diameter of the shaft portion 13a of the bolt 13, and hence the angle of the reflection mirror 2 about the vertical direction as an axial direction of the rotation can be adjusted even in the state in which the bolt 13 is mounted. The engagement groove 2f in the reflection mirror 2 with which the shaft portion 10a of the shaft member 10 is engaged is formed into a groove a longitudinal direction of which is the front-back direction, and hence the angle of the reflection mirror 2 about the vertical direction as an axial direction of the rotation can be adjusted.

The screwed amount of the bolt 13 in the screw hole 3p of the mirror holding frame 3 is adjusted to adjust the angle of the reflection mirror 2 about the horizontal direction as an axial direction of the rotation. The adjustment of the angle of the reflection mirror 2 about the horizontal direction as an axial direction of the rotation is also performed in the state in which the mirror holding frame 3 is fixed to the fixation frame 6, the fixation frame 6 is fixed to the lens barrel 5, and the reflection mirror 2 is mounted to the mirror holding frame 3 with the leaf spring 11, the compression coil spring 12, and the bolts 13 and 22.

Main Effects in the Present Embodiment

As described above, in the present embodiment, the cam member 9 is rotated in the state in which the mirror holding frame 3 is fixed to the fixation frame 6, the fixation frame 6 is fixed to the lens barrel 5, and the reflection mirror 2 is mounted to the mirror holding frame 3 with the leaf spring 11, the compression coil spring 12, and the bolts 13 and 22, thereby continuously adjusting the position of the reflection mirror 2 in the vertical direction and the angle of the reflection mirror 2 about the front-back direction as an axial direction of the rotation. Consequently, in the present embodiment, the position of the reflection mirror 2 in the vertical direction and the angle of the reflection mirror 2 about the front-back direction as an axial direction of the rotation can be finely adjusted while checking a projection image reflected by the reflection surface 2a of the reflection mirror 2 and projected on a projection surface.

In the present embodiment, the screwed amount of the adjustment bolt 34 in the screw hole 32c of the jig main body portion 32 is adjusted in the state in which the mirror holding frame 3 is fixed to the fixation frame 6, the fixation frame 6 is fixed to the lens barrel 5, and the reflection mirror 2 is mounted to the mirror holding frame 3 with the leaf spring 11, the compression coil spring 12, and the bolts 13 and 22, thereby adjusting the angle of the reflection mirror 2 about the vertical direction as an axial direction of the rotation. Consequently, in the present embodiment, the angle of the reflection mirror 2 about the vertical direction as an axial direction of the rotation can be finely adjusted while checking a projection image reflected by the reflection surface 2a of the reflection mirror 2 and projected on a projection surface.

In addition, in the present embodiment, the screwed amount of the bolt 13 in the screw hole 3p of the mirror holding frame 3 is adjusted in the state in which the mirror holding frame 3 is fixed to the fixation frame 6, the fixation frame 6 is fixed to the lens barrel 5, and the reflection mirror 2 is mounted to the mirror holding frame 3 with the leaf spring 11, the compression coil spring 12, and the bolts 13 and 22, thereby adjusting the angle of the reflection mirror 2 about the horizontal direction as an axial direction of the rotation. Consequently, in the present embodiment, the angle of the reflection mirror 2 about the horizontal direction as an axial direction of the rotation can be finely adjusted while checking a projection image reflected by the reflection surface 2a of the reflection mirror 2 and projected on a projection surface.

In the present embodiment, the adjustment of the position of the reflection mirror 2 in the vertical direction, the adjustment of the angle of the reflection mirror 2 about the front-back direction as an axial direction of the rotation, and the adjustment of the angle of the reflection mirror 2 about the vertical direction as an axial direction of the rotation are performed in the state in which the reflection mirror 2 is mounted to the mirror holding frame 3 with the leaf spring 11, the compression coil spring 12, and the bolts 13 and 22, and hence the adjusted reflection mirror 2 can be prevented from being deviated with respect to the mirror holding frame 3.

In the present embodiment, the cam member 9 is held by the side surface portion 3a such that the cam member 9 can be rotated about the horizontal direction as an axial direction of the rotation. Thus, in the present embodiment, the mirror holding mechanism 1 can be downsized in the horizontal direction as compared with the case where the cam member 9 is held by the side surface portion 3a such that the cam member 9 can be rotated about the front-back direction or the vertical direction as an axial direction of the rotation. In the present embodiment, the cam member 9 is fixed to the side surface portion 3a with the bolt 18, and hence the cam member 9 can be prevented from being deviated after the position of the reflection mirror 2 in the vertical direction or the angle of the reflection mirror 2 about the front-back direction as an axial direction of the rotation is adjusted.

In the present embodiment, the shaft support portion 3h is formed on the side surface portion 3a. Thus, in the present embodiment, the jig-side gear 30b of the adjustment jig 30 and the gear 9b of the cam member 9 can be easily and reliably engaged with each other. Consequently, in the present embodiment, the cam member 9 can be easily rotated by using the adjustment jig 30, and as a result, the position of the reflection mirror 2 in the vertical direction and the angle of the reflection mirror 2 about the front-back direction as an axial direction of the rotation can be easily adjusted. In the present embodiment, the adjustment jig 30 is used to rotate the cam member 9, and hence by increasing the gear ratio between the gear 9b and the jig-side gear 30b, the cam member 9 can be precisely rotated by a minute angle. Consequently, in the present embodiment, by increasing the gear ratio between the gear 9b and the jig-side gear 30b, the adjustment of the position of the reflection mirror 2 in the vertical direction and the adjustment of the angle of the reflection mirror 2 about the front-back direction as an axial direction of the rotation can be precisely performed.

Other Embodiments

In the above-mentioned embodiment, in order to adjust the position of the reflection mirror 2 in the vertical direction or adjust the angle of the reflection mirror 2 about the front-back direction as an axial direction of the rotation, the adjustment jig 30 is used to rotate the cam member 9, but the cam member 9 may be rotated by directly gripping the cam member 9. In this case, the gear 9b is not necessarily required to be formed on the outer circumferential surface of the cam member 9. In this case, the shaft support portion 3h is not necessarily required to be formed on the side surface portion 3a. In the above-mentioned embodiment, the position of the reflection mirror 2 in the front-back direction is adjusted by adjusting the mounting position of the fixation frame 6 in the front-back direction with respect to the lens barrel 5, but the position of the reflection mirror 2 in the front-back direction may be adjusted by pushing the flat surfaces 2g formed at two locations on the reflection mirror 2 by the same amount with the two adjustment bolts 34 of the adjustment jig 31. Specifically, the position of the reflection mirror 2 in the front-back direction may be adjusted by moving the reflection mirror 2 in the front-back direction with respect to the mirror holding frame 3 with use of the adjustment jig 31.

In the above-mentioned embodiment, each of the two shaft portions 10b that protrude from the reflection mirror 2 to both outer sides in the horizontal direction is movable in the vertical direction, but only one shaft portion 10b that protrudes from the reflection mirror 2 to one side in the horizontal direction may be movable in the vertical direction. For example, the shaft portion 10b that protrudes from the reflection mirror 2 to one side in the horizontal direction may be inserted through the guide hole 3g and engaged with the cam groove 9c, and the shaft portion 10b that protrudes from the reflection mirror 2 to the other side in the horizontal direction may be inserted through and supported by a round support hole formed in the mirror holding frame 3. In this case, the guide hole 3g is not formed in the side surface portion 3a disposed on the other side in the horizontal direction. The cam member 9 is not disposed on the other side in the horizontal direction.

In the above-mentioned embodiment, the shaft member 10 is formed separately from the reflection mirror 2, but the shaft portions 10b that protrude from the reflection mirror 2 to both outer sides in the horizontal direction may be formed integrally with the reflection mirror 2. In the above-mentioned embodiment, a protruding portion and a groove such as the spring abutment portion 2b and the engagement groove 2f are directly formed in the reflection mirror 2, but a predetermined frame member may be fixed on the outer circumferential side of the reflection mirror 2 so as to be integrated with the reflection mirror 2, and a protruding portion and a groove corresponding to the spring abutment portion 2b and the engagement groove 2f may be formed in the frame member. In the above-mentioned embodiment, the cam member 9 rotates about the horizontal direction as an axial direction of the rotation, but the cam member 9 may rotate about the front-back direction or the vertical direction as an axial direction of the rotation. In the above-mentioned embodiment, predetermined marks may be provided to the side surface portion 3a and the cam member 9 in order to indicate the initial position of the cam member 9.

In the above-mentioned embodiment, the cam member 9 is rotated to continuously adjust the position of the reflection mirror 2 in the vertical direction and the angle of the reflection mirror 2 about the front-back direction as an axial direction of rotation, but the cam member 9 may be rotated to continuously adjust the position of the reflection mirror 2 in the front-back direction and the angle of the reflection mirror 2 about the vertical direction as an axial direction of rotation. In this case, the guide hole 3g is formed into a long hole a longitudinal direction of which is the front-back direction, and the cam surface 9e is formed into a predetermined shape such that the shaft member 10 moves in the front-back direction. In this case, for example, the engagement groove 2f is formed such that the longitudinal direction of the engagement groove 2f is aligned with the vertical direction and one vertical end of the engagement groove 2f is opened. Alternatively, a circular concave portion to which the shaft portion 10a of the shaft member 10 is inserted is formed instead of the engagement groove 2f. The cam member 9 may be rotated to continuously adjust the position of the reflection mirror 2 in a direction that is orthogonal to the horizontal direction and is inclined with respect to the front-back direction and the vertical direction and continuously adjust the angle of the reflection mirror 2 about a direction orthogonal to the direction and the horizontal direction as an axial direction of rotation. In this case, the guide hole 3g, the cam surface 9e, and the engagement groove 2f need to be formed so as to enable such adjustment.

REFERENCE SIGNS LIST 1 mirror holding mechanism
2 reflection mirror
2a reflection surface
2f engagement groove
2g flat surface
3 mirror holding frame (mirror holding member)
3a side surface portion
3g guide hole
3h shaft support portion
9 cam member
9b gear
9e cam surface
10 shaft member
10b shaft portion
18 bolt (fixation bolt)
30 adjustment jig
30b jig-side gear
30d rotation center shaft portion
X second direction
Y third direction (orthogonal direction)
Z first direction

The invention claimed is:

1. A mirror holding mechanism, comprising:
a reflection mirror having a curved reflection surface;
a mirror holding member holding the reflection mirror; and
a cam member rotatably held by the mirror holding member, wherein
when a direction parallel to an optical axis of the reflection mirror is a first direction, a direction orthogonal to the first direction is a second direction, and a direction orthogonal to the first direction and the second direction is a third direction,
the mirror holding member has two side surface portions disposed so as to sandwich the reflection mirror in the second direction,
at least one of the two side surface portions has a guide hole through which a shaft portion protruding from the reflection mirror to an outer side in the second direction is inserted, the guide hole being formed so as to pass through the side surface portion,
the guide hole is formed into a long hole a longitudinal direction of which is an orthogonal direction orthogonal to the second direction,
the cam member is disposed on an outer side of the side surface portion in the second direction and rotatably held by the side surface portion,
the cam member has a cam surface with which a distal end part of the shaft portion comes into contact, and
when the cam member rotates, the shaft portion moves in the orthogonal direction.

2. The mirror holding mechanism according to claim 1, wherein the orthogonal direction is the third direction.

3. The mirror holding mechanism according to claim 2, wherein the cam member is held by the side surface portion so as to be rotatable about the second direction as an axial direction of rotation.

4. The mirror holding mechanism according to claim 2, wherein
the shaft portions protrude from the reflection mirror to both outer sides in the second direction,
the guide holes are formed in the two side surface portions, and
the cam member is disposed on each of both outer sides of the two side surface portions in the second direction, respectively.

5. The mirror holding mechanism according to claim 4, further comprising a shaft member that has the shaft portion formed therein and is formed separately from the reflection mirror, wherein
an engagement groove a longitudinal direction of which is the first direction and one end side in the first direction of which is opened is formed in each of both end surfaces of the reflection mirror in the second direction, one end side of the shaft member is engaged with the engagement groove, and another end side of the shaft member is the shaft portion.

6. The mirror holding mechanism according to claim 2, wherein a flat surface orthogonal to the first direction is formed on a surface opposite to the reflection surface of the reflection mirror on either side in the second direction.

7. The mirror holding mechanism according to claim 2, wherein
the cam member has a gear formed on an outer circumferential surface thereof, and
the side surface portion has a shaft support portion configured to rotatably support a rotation center shaft portion of an adjustment jig on which a jig-side gear to be engaged with the gear is formed on an outer circumferential surface thereof.

8. The mirror holding mechanism according to claim 1, wherein the cam member is held by the side surface portion so as to be rotatable about the second direction as an axial direction of rotation.

9. The mirror holding mechanism according to claim 1, wherein
the shaft portions protrude from the reflection mirror to both outer sides in the second direction,
the guide holes are formed in the two side surface portions, and
the cam member is disposed on each of both outer sides of the two side surface portions in the second direction, respectively.

10. The mirror holding mechanism according to claim 9, further comprising a shaft member that has the shaft portion formed therein and is formed separately from the reflection mirror, wherein
the orthogonal direction is the third direction,
an engagement groove a longitudinal direction of which is the first direction and one end side in the first direction of which is opened is formed in each of both end surfaces of the reflection mirror in the second direction,
one end side of the shaft member is engaged with the engagement groove, and
another end side of the shaft member is the shaft portion.

11. The mirror holding mechanism according to claim 1, further comprising a fixation bolt to fix the cam member to the side surface portion.

12. The mirror holding mechanism according to claim 1, wherein a flat surface orthogonal to the first direction is formed on a surface opposite to the reflection surface of the reflection mirror on either side in the second direction.

13. The mirror holding mechanism according to claim 1, wherein
the cam member has a gear formed on an outer circumferential surface thereof, and
the side surface portion has a shaft support portion configured to rotatably support a rotation center shaft portion of an adjustment jig on which a jig-side gear to be engaged with the gear is formed on an outer circumferential surface thereof.

* * * * *